F. B. ALLDREDGE.
STEERING GEAR.
APPLICATION FILED JULY 31, 1918.
1,296,251.
Patented Mar. 4, 1919.
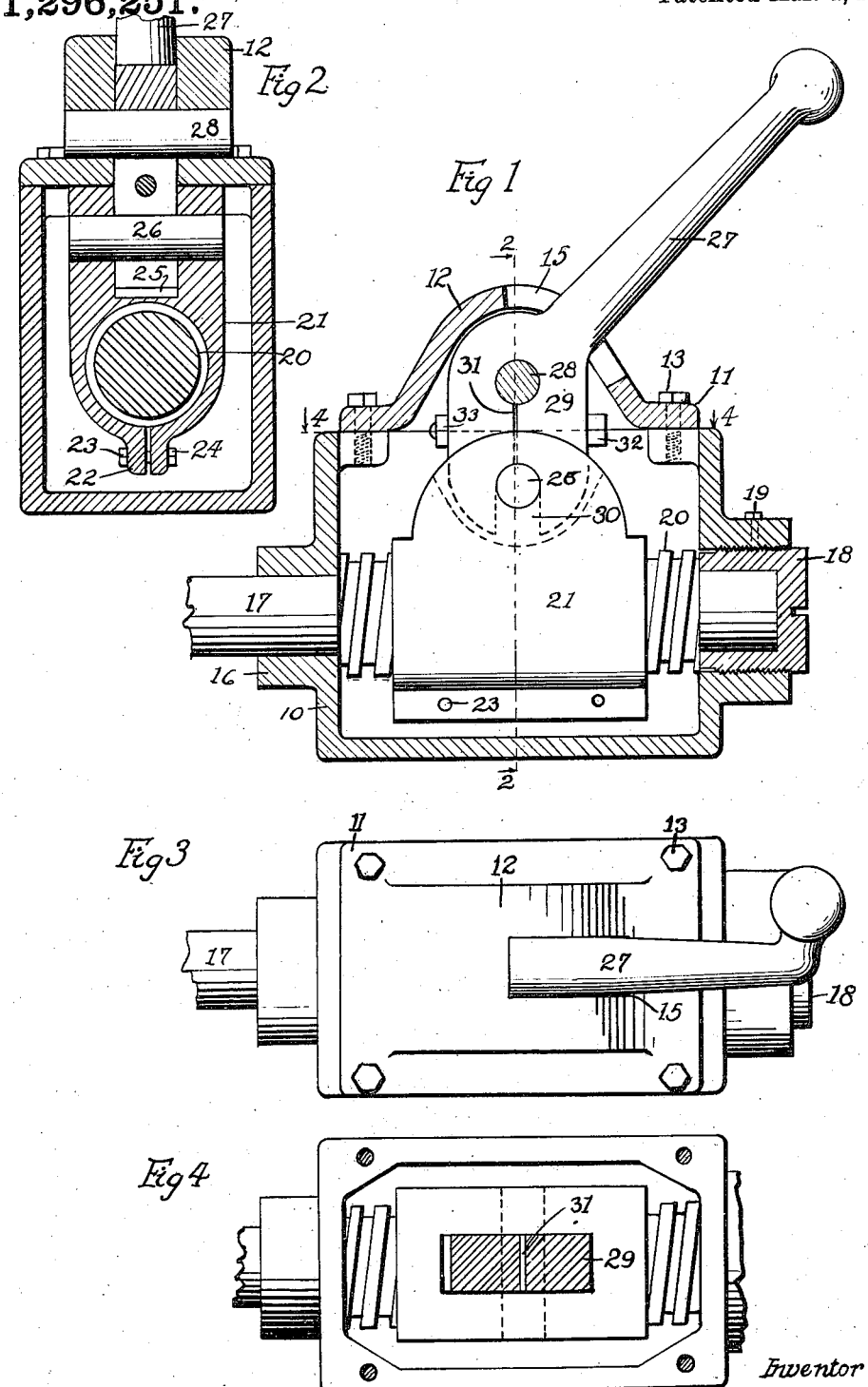

UNITED STATES PATENT OFFICE.

FRANCIS B. ALLDREDGE, OF DES MOINES, IOWA.

STEERING-GEAR.

1,296,251.  Specification of Letters Patent.  Patented Mar. 4, 1919.

Application filed July 31, 1918. Serial No. 247,686.

*To all whom it may concern:*

Be it known that I, FRANCIS B. ALLDREDGE, a citizen of the United States, and a resident of Des Moines, in the county of Polk and State of Iowa, have invented a certain new and useful Steering-Gear, of which the following is a specification.

My invention relates to steering gears of the type used on automobiles and the like.

The object of my invention is to provide a steering gear of very simple and inexpensive construction, and particularly when in use there will be a minimum loss of motion.

With this and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a top or plan view of the steering gear embodying my invention, laid on its side, the casing being shown in cross section.

Fig. 2 shows a vertical, sectional view taken on the line 2—2 of Fig. 1.

Fig. 3 shows a side elevation of the device; and

Fig. 4 shows a sectional view taken on the line 4—4 of Fig. 1.

In the accompanying drawings I have used the reference numeral 10 to indicate generally the casing for my improved steering gear, which has the removable cover plate 11 provided with a dome or outwardly extended portion 12 and secured to the body of the casing by means of screw-bolts 13.

The dome portion of the cover plate has an elongated slot 15 through which the steering arm 27, hereinafter mentioned, extends.

At one end of the casing 10 there is formed a bearing 16 in which is mounted a smooth portion of a shaft 17. Screwed into the other end of the casing is a hollow plug 18, which may be held in position by means of a set-screw 19 and which forms a bearing for the opposite end of the shaft 17. The portion of the shaft 17 within the casing is screw-threaded as at 20.

Mounted on the screw-threaded portion 20 of the shaft 17 is a nut 21, split longitudinally in its lower portion and having laterally extending flanges 22, which are adjustably connected by means of bolts 23 and nuts 24.

On its side opposite the flanges 22 the nut 21 has a laterally extending portion in which is formed a recess 25. A pin 26 is mounted in said extension and extends across said recess 25.

A steering arm 27 is extended through the slot 15 and is rotatably mounted on a shaft 28 mounted in the side walls of the cover plate 12.

The steering rod has formed at its inner end a bearing 29 which is split from the shaft 28 toward the shaft 17, as illustrated at Fig. 1.

At its inner end the bearing 29 has a groove 30, shown by dotted lines in Fig. 1, in which is received the pin 26.

The parts of the bearing 29 on opposite sides of the slit 31, already mentioned, are adjustably held together by means of a bolt 32 and a nut 33.

In the practical use of my improved steering gear, the shaft 18 is rotated for moving the nut longitudinally thereon. The movement of the nut 21 carries the pin 26 therewith and thereby rotates the bearing 29 on the shaft 28 and imparts swinging movement to the outer end of the steering arm 27 for operating the additional steering mechanism of the automobile or the like.

It will be understood that the groove 30 is deep enough to permit the proper play of the pin 26 in said groove in the direction of depth and yet allow no substantial play in the groove from side to side thereof.

Another of the important features and advantages of my improved steering gear arises from the fact that there is imparted from the shaft 17 to the steering arm 27 positive movement with practically no lost motion or free play between any of the parts.

In the original installation of the steering gear a slight space is left between the flanges 22, and a slight space is left between the parts of the bearing 29 on opposite sides of the slit 31 therein.

These features of construction make it possible to tighten the nut 21 on the screw-threaded portion 20 of the shaft 17 in case there should come to be play of the nut on the shaft after considerable wear; and also allows the tightening of the bearing 29 with relation to the pin 26 in case there should come to be play after the device has been in use for some time.

Thus I am enabled to avoid play in the parts, and to thereby insure the positive transmission of motion without lost motion for a very long period of use.

It will, of course, be understood that the device may be mounted on the frame of the automobile in any suitable way by flanges formed on the casing 10 or otherwise as may be desired.

Such methods or means of attachment in themselves form no part of my present invention.

It may also be mentioned that the arm 29 may be bent or curved, or lengthened or shortened to make the device fit motor vehicles of different kinds.

It thus appears that my steering gear has a wide range of adaptability.

It will, of course, be understood that the shaft 17 may be connected with the steering wheel of the automobile in any suitable manner.

It is my purpose to cover by this application and the claim of the patent to be issued thereon, any changes or modified forms of structure which may be reasonably included within the scope of my invention.

I claim:

In a device of the class described, a casing, a shaft mounted therein having a screw-threaded portion, a split nut on said shaft, means for adjustably tightening said nut, a second shaft, a bearing mounted thereon, a steering arm on said bearing, said nut having an extension provided with a recess, a pin extended across said recess, said bearing having a groove receiving said pin, said bearing being split from said shaft to said groove, and means for adjustably tightening the split portion of the bearing.

Des Moines, Iowa, July 18, 1918.

FRANCIS B. ALLDREDGE.